United States Patent
Landis et al.

(10) Patent No.: US 9,182,297 B2
(45) Date of Patent: Nov. 10, 2015

(54) EXHAUST GAS TEMPERATURE SENSOR INCLUDING A VIBRATION REDUCING AND/OR MODIFYING SLEEVE

(75) Inventors: Ronald N. Landis, Bellville, OH (US); Douglas I. Obenour, Bellville, OH (US); Robert J. Sparks, Bellville, OH (US)

(73) Assignee: Stoneridge, Inc., Warren, OH (US)

( * ) Notice: Subject to any disclaimer, the term of this patent is extended or adjusted under 35 U.S.C. 154(b) by 99 days.

(21) Appl. No.: 13/592,448

(22) Filed: Aug. 23, 2012

(65) Prior Publication Data
US 2013/0223478 A1     Aug. 29, 2013

Related U.S. Application Data

(60) Provisional application No. 61/526,345, filed on Aug. 23, 2011.

(51) Int. Cl.
| | |
|---|---|
| *G01K 1/00* | (2006.01) |
| *G01K 9/00* | (2006.01) |
| *G01K 13/02* | (2006.01) |
| *G01K 1/08* | (2006.01) |
| *F01D 17/08* | (2006.01) |

(52) U.S. Cl.
CPC .............. *G01K 13/02* (2013.01); *F01D 17/085* (2013.01); *G01K 1/08* (2013.01); *G01K 2205/04* (2013.01)

(58) Field of Classification Search
USPC .......................................... 374/144, 148, 208
See application file for complete search history.

(56) References Cited

U.S. PATENT DOCUMENTS

| | | |
|---|---|---|
| 2,820,840 A | 1/1958 | Cantlin et al. |
| 3,741,816 A | 6/1973 | Wagner |
| 4,102,196 A | 7/1978 | Holtermann |
| 4,304,126 A | 12/1981 | Yelke |
| 4,323,727 A | 4/1982 | Berg |
| 4,361,036 A | 11/1982 | Levenson |
| 4,499,330 A | 2/1985 | Pustell |
| 4,672,845 A | 6/1987 | Hirsch et al. |
| 4,733,019 A | 3/1988 | Pichler et al. |
| 4,934,831 A | 6/1990 | Volbrecht |

(Continued)

FOREIGN PATENT DOCUMENTS

| | | |
|---|---|---|
| CN | 101454651 A | 6/2009 |
| WO | 2011-094753 | 8/2011 |

OTHER PUBLICATIONS

International Search Report dated Oct. 28, 2011 issued in related International Patent Application No. PCT/US2011/023390.

(Continued)

*Primary Examiner* — Mirellys Jagan
(74) *Attorney, Agent, or Firm* — Grossman, Tucker, Perreault & Pfleger, PLLC

(57) ABSTRACT

A temperature sensor system includes a temperature sensor, a cable having an end coupled to the temperature sensor, and a stop flange coupled to the cable. The temperature sensor system further includes a vibration reducing and/or modifying sleeve positioned against the stop flange. The sleeve includes a body portion defining a through passage configured to receive and retain at least a portion of the cable. The sleeve is configured to provide stability and reduce vibrational stress to the temperature sensor system. The sleeve is configured to be added to the temperature sensor system during assembly of the system and/or to be added after the temperature sensor system is fully assembled.

20 Claims, 7 Drawing Sheets

(56) References Cited

U.S. PATENT DOCUMENTS

| | | |
|---|---|---|
| 5,396,966 A | 3/1995 | Roos, Jr. et al. |
| 5,749,656 A | 5/1998 | Boehm et al. |
| 5,823,680 A | 10/1998 | Kato et al. |
| 6,334,707 B1 | 1/2002 | Ku |
| 6,338,571 B1 | 1/2002 | Chen |
| 6,367,974 B1 | 4/2002 | Lin |
| 6,501,366 B2 | 12/2002 | Takahashi |
| 6,679,627 B1 | 1/2004 | Allaire |
| 7,021,824 B2 | 4/2006 | Wawro et al. |
| 7,104,685 B2 | 9/2006 | Hanzawa et al. |
| 7,360,947 B2 | 4/2008 | Krishnamurthy et al. |
| 7,465,086 B1 | 12/2008 | Foreman |
| 7,931,401 B2 | 4/2011 | Landis et al. |
| 2002/0084884 A1 | 7/2002 | Takahashi et al. |
| 2004/0101028 A1 | 5/2004 | Iwaya et al. |
| 2004/0134282 A1 | 7/2004 | Hayashi et al. |
| 2004/0134559 A1 | 7/2004 | Huang |
| 2004/0218662 A1 | 11/2004 | Hanzawa et al. |
| 2005/0193838 A1 | 9/2005 | Valles |
| 2005/0265426 A1 | 12/2005 | Hanzawa |
| 2006/0176931 A1 | 8/2006 | Miyahara et al. |
| 2008/0149208 A1 | 6/2008 | Kurara et al. |
| 2008/0205484 A1 | 8/2008 | Toudou et al. |
| 2009/0151859 A1 | 6/2009 | Landis et al. |
| 2010/0054301 A1 | 3/2010 | Abe et al. |
| 2010/0195698 A1 | 8/2010 | Hori |
| 2013/0064266 A1* | 3/2013 | Mori .............................. 374/165 |
| 2014/0064926 A1 | 3/2014 | Warren |

OTHER PUBLICATIONS

International Search Report and Written Opinion mailed Nov. 2, 2012 in connection with corresponding PCT Patent Application No. PCT/US12/51982.

Office Action mailed Jan. 26, 2015 in corresponding U.S. Appl. No. 13/019,202.

Office Action mailed May 12, 2015 in corresponding U.S. Appl. No. 13/019,202.

European Search Report mailed Apr. 20, 2015 in corresponding European Patent Application No. 12825293.9.

Chinese Official Action dated May 28, 2015 in corresponding Chinese Patent Application No. 201280040707.4.

* cited by examiner

EXHAUST GAS TEMPERATURE SENSOR INCLUDING A VIBRATION REDUCING AND/OR MODIFYING SLEEVE

CROSS REFERENCE TO RELATED APPLICATIONS

The present non-provisional application claims the benefit of U.S. Provisional Patent Application Ser. No. 61/526,345, filed Aug. 23, 2011, the entire disclosure of which is incorporated herein by reference.

FIELD

The present disclosure relates generally to temperature sensors for internal combustion engines. More specifically, the present disclosure may relate to an exhaust gas temperature sensor including a vibration reducing and/or modifying sleeve.

BACKGROUND

Internal combustion engines such as, but not limited to, diesel and gasoline engines, may include one or more temperature sensors at least partially disposed within the exhaust gas system. These temperature sensors may sense the temperature of the exhaust gas and may be used, at least in part, by an engine control system to adjust one or more properties of the engine such as, but not limited to, air/fuel ratio, boost pressure, timing or the like. Because of the operating environment, the temperature sensors may be exposed to relatively harsh conditions including, but not limited to, vibration, exposure to debris, moisture and corrosive chemicals, large temperature ranges and relatively high continuous use operating temperatures. The conditions may degrade the performance of the temperature sensors and may, ultimately, render the temperature sensors unsuitable for their intended purpose.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

The present disclosure is generally directed at temperature sensors. Embodiments described herein may relate to an exhaust gas temperature sensor system, for example, an exhaust gas temperature sensor system configured to be used with an internal combustion engine such as, but not limited to, a diesel engine, a gasoline engine, or the like. The output of the exhaust gas temperature sensor system may be received by a controller to control one or more parameters of the engine. However, a sensor and/or system consistent with the present disclosure may be used to detect, sense and/or monitor the temperature of other parameters including, but not limited to, catalytic converter temperature, lubricant temperature (such as, but not limited to, engine oil, transmission oil, differential oil, or the like), brake temperature, engine coolant temperature, or the like. A sensor and/or system consistent with the present disclosure may be employed in connection with various other applications, both related to, and unrelated to, vehicles.

Figure 1:
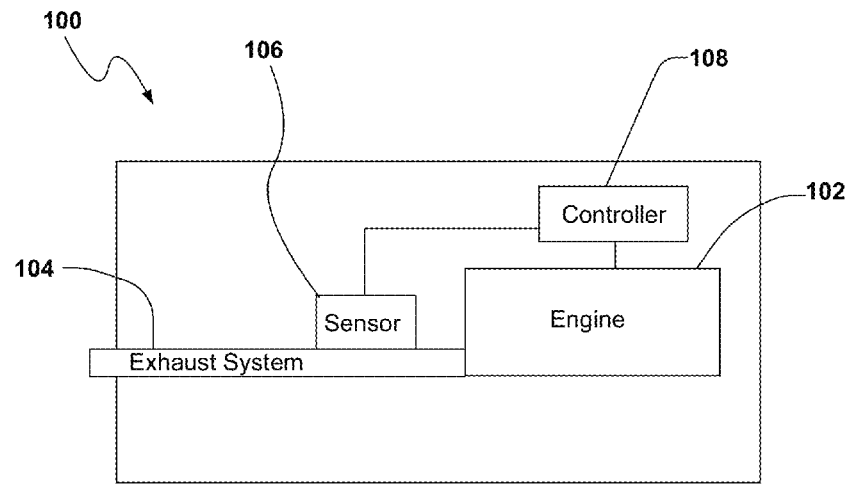
FIG. 1 is a schematic illustration of a vehicle including a temperature sensor consistent with the present invention.

Referring to FIG. 1 an embodiment of a vehicle 100 is schematically depicted. The vehicle 100 may include an internal combustion engine 102 having an exhaust system 104 which may carry a flow of exhaust gasses from the engine 102. A temperature sensor 106 may be coupled to the exhaust system 104 for measuring a temperature of the exhaust gasses carried by the exhaust system 104. The temperature sensor 106 may provide an output responsive to, or indicative of, a temperature of the exhaust gasses. A vehicle control system 108, such as an engine control module (ECM), etc., may receive the output from the temperature sensor 106. The engine control system 108 may vary one or more operating parameters, such as fuel delivery, air/fuel ratio, boost pressure, timing or the like in response to the output of the temperature sensor 106.

Figure 2:
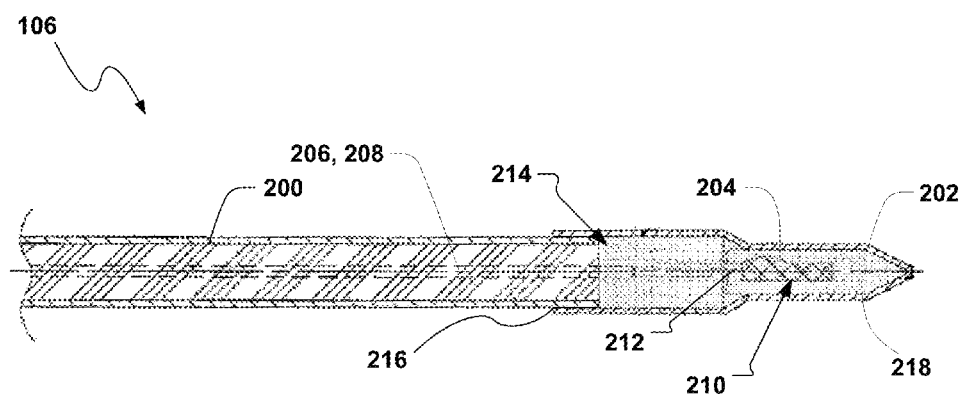
FIG. 2 is a side cross-sectional view of an embodiment of a temperature sensor consistent with the present invention.
Figure 3:
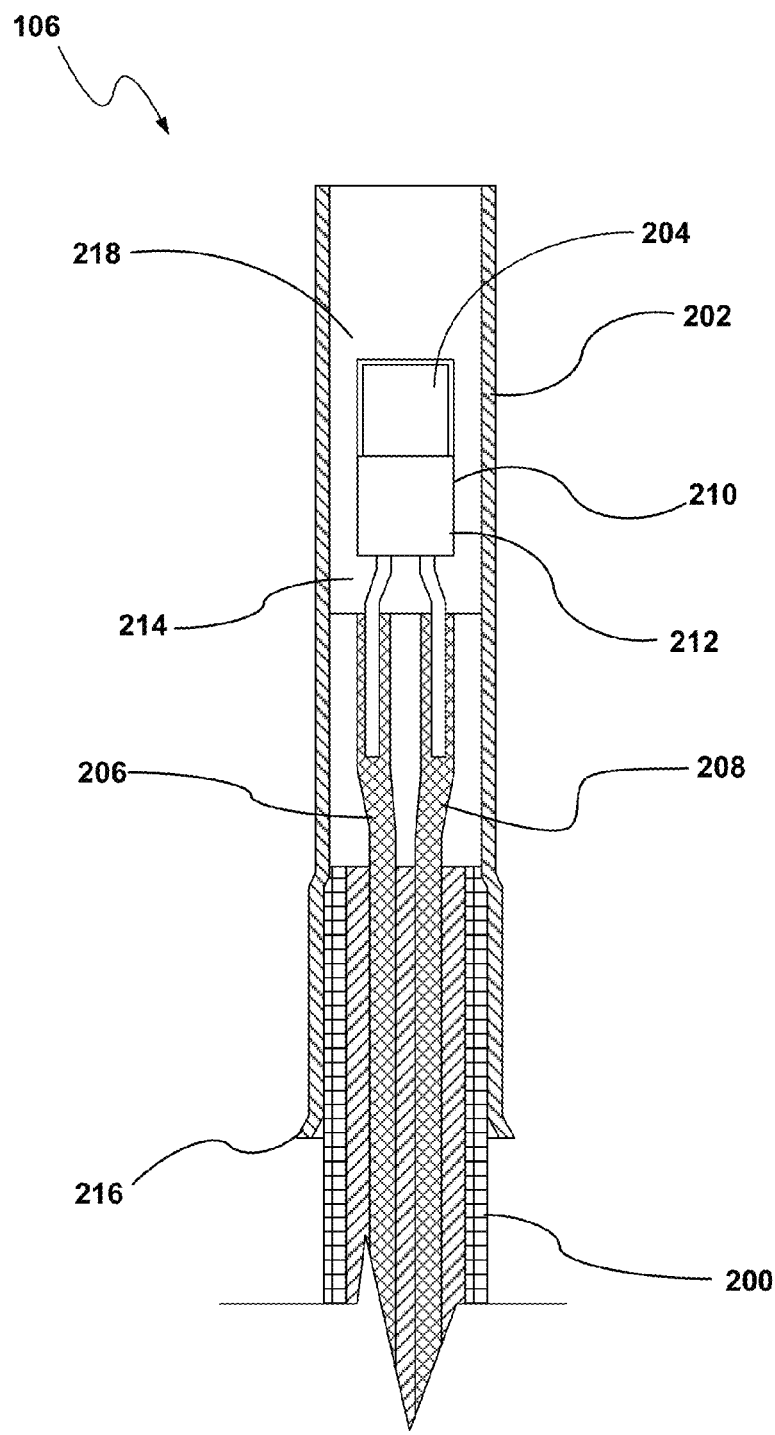
FIG. 3 is a front cross-sectional view of the temperature sensor of FIG. 2.

Turning to FIGS. 2 and 3, a portion of an embodiment of a temperature sensor 106 consistent with the present invention is shown in side and front cross-sectional views. The temperature sensor 106 may generally include a longitudinal body 200 having a housing 202 disposed at one end of the body 200. A temperature sensing element 204 may be disposed at least partially within the housing 202. Electrical conductors 206, 208 for the temperature sensor 106 may extend from the temperature sensing element 204 and through the body 200. The temperature sensor system may include various mounting features, such as a flange and mounting nut, a compression ferrule, etc., capable of mounting the temperature sensor extending at least partially into an exhaust system while maintaining a generally sealed condition of the exhaust system. Similarly, the temperature sensor system may include electrical connectors or contacts electrically coupled to the electrical connections for the temperature sensor. Suitable connectors may include integral features as well as pigtail connectors, etc.

The temperature sensing element 204 may be a resistive temperature sensing element, in which the electrical resistance through the element may vary as a function of temperature. In a particular embodiment, the temperature sensing element 204 may be a thin film resistive temperature detector including at least one metal film 210, e.g. a platinum film, film disposed on a substrate 212. Various temperature sensing elements utilizing resistance temperature detector (RTD), negative temperature coefficient (NTC), and/or thermocouple type elements may also be used in connection with embodiments of the present disclosure.

As shown, the housing 202 may define an interior volume 214. The temperature sensing element 204 may be at least partially disposed within the interior volume defined by the housing 202. As such, the temperature sensing element 204 may be at least partially encapsulated by the housing 202. The housing 202 may be coupled to the body 200 of the temperature sensor 106 at an open end 216 of the housing 202. In one embodiment, the housing 202 may be coupled to the body 200 to provide a generally gas tight seal, thereby placing the temperature sensing element 204 in a generally closed environment. The generally closed environment may reduce or eliminate exposure of the temperature sensing element 204 to contaminants, etc., of the exterior environment.

Consistent with the present disclosure, a filler material 218 may be disposed within the housing 202, and may at least partially surround the temperature sensing element 204. In general, the filler material 218 may provide thermal conductivity while being flexible to accommodate for thermally induced stresses in or between the sensor elements, e.g. between the sensing element 204 and leads connected thereto, during operation. A variety of materials may suitably be employed as the filler material 218 in connection with the present disclosure.

The filler material 218 has a greater thermal conductivity than air or a gaseous medium. The filler material 218 may thus, at least to some extent, overcome any insulating effect of the separation between the housing 202 and the temperature sensing element 204. The filler material 218 may provide a thermal pathway between the housing 202 and the temperature sensing element 204, and may, thereby, increase the thermal response of the temperature sensor 106.

In addition, use of the filler material 218 may eliminate the need for a separate mechanical strain relief to accommodate for thermally induced stresses on the sensor elements. Instead of the separate strain relief, the filler material may be resiliently flexible/expandable to allow the sensor components, e.g. the sensing element and the leads coupled thereto, to expand at different rates, e.g. due different coefficients of thermal expansion. This alleviates thermally induced stresses in the sensor, without requiring a separate mechanical strain relief.

Figure 4:
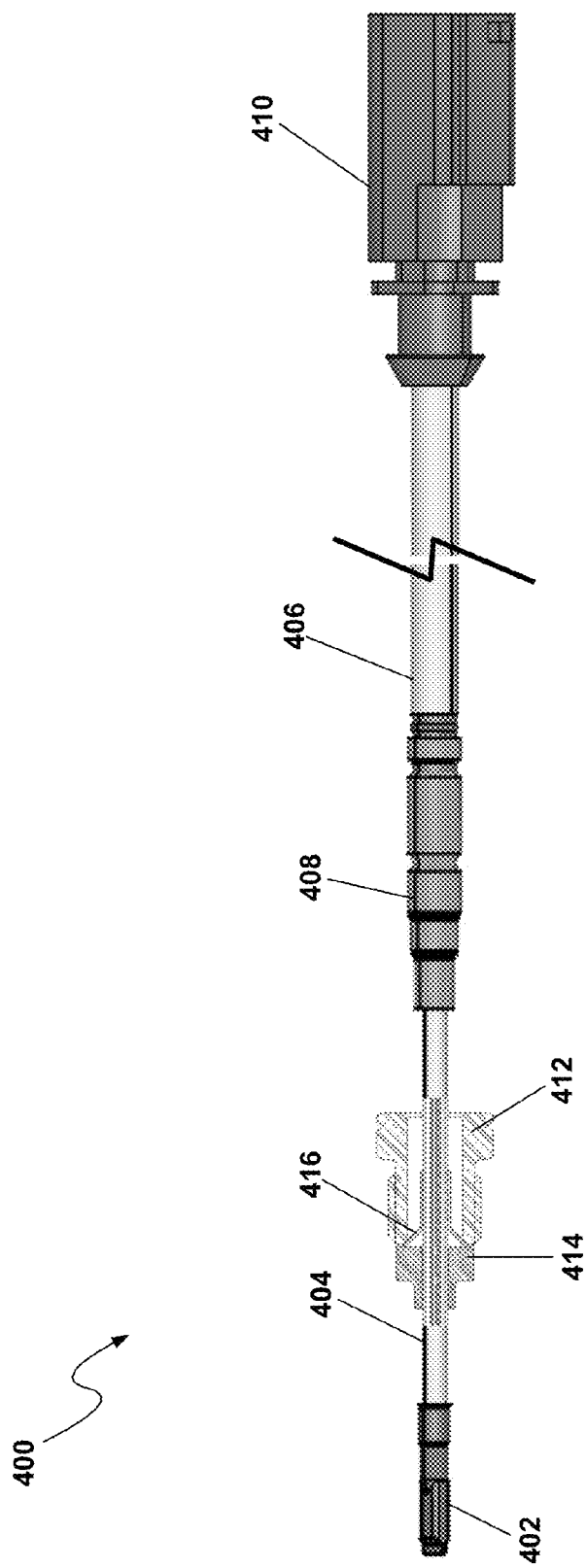
FIG. 4 is a side view of a temperature sensor system including one embodiment of a vibration reducing and/or modifying sleeve consistent with the present disclosure.

Referring now to FIG. 4, there is illustrated a temperature sensor system 400 consistent with at least one embodiment herein. The exhaust gas temperature sensor system 400 may include a temperature sensor 402, such as the sensor 106 described above, coupled to one end of a cable 404 including one or more electrical conductors, such as a mineral insulated (MI) cable, a wire harness assembly 406, and a coupler 408 configured to couple the cable 404 to the wire harness assembly 406. The wire harness assembly 406 may optionally include a connector 410 configured to electrically and/or mechanically couple the exhaust gas temperature sensor system 400 to a wiring harness or the like, and ultimately to at least a portion and/or subsystem of the ECM.

The temperature sensor 402 may be configured to output a signal representative of the temperature of the exhaust gas, for example, the exhaust gas flowing through at least a portion of the exhaust gas system. The temperature sensor 402 may be selected depending on the intended operating temperature range, accuracy and/or precision desired. According to at least one embodiment consistent herein, the temperature sensor 402 may include a resistive temperature detector (RTD).

The temperature sensor 402 may be configured to be removably securable. For example, exhaust gas temperature sensor system 400 may include a mounting nut 412 and optionally a stop flange 414. It should be noted that the mounting nut 412 and stop flange 414 are illustrated in sectional views to make the vibration reducing and/or modifying sleeve 416, as described below, more apparent. The mounting nut 412 may be internally or externally threaded and may be configured to be threaded within an aperture of the exhaust gas system (such as, but not limited to, the exhaust manifold, down pipe, or the like) until the stop flange 414 engages the exhaust system (for example, a shoulder on the exhaust system).

The temperature sensor system 400 may further include a vibration reducing and/or modifying sleeve 416 (hereinafter referred to as "sleeve 416" for ease of description) configured to provide stability against mechanical vibration in the temperature sensor system 400. As shown, the sleeve 416 is positioned between the stop flange 414 and the mounting nut 412 when the temperature sensor system 400 is fully assembled. The sleeve 416 may be added during the assembly of the temperature sensor system 400 or may be added after the temperature sensor system 400 is fully assembled, as described in greater detail below.

Figure 5:
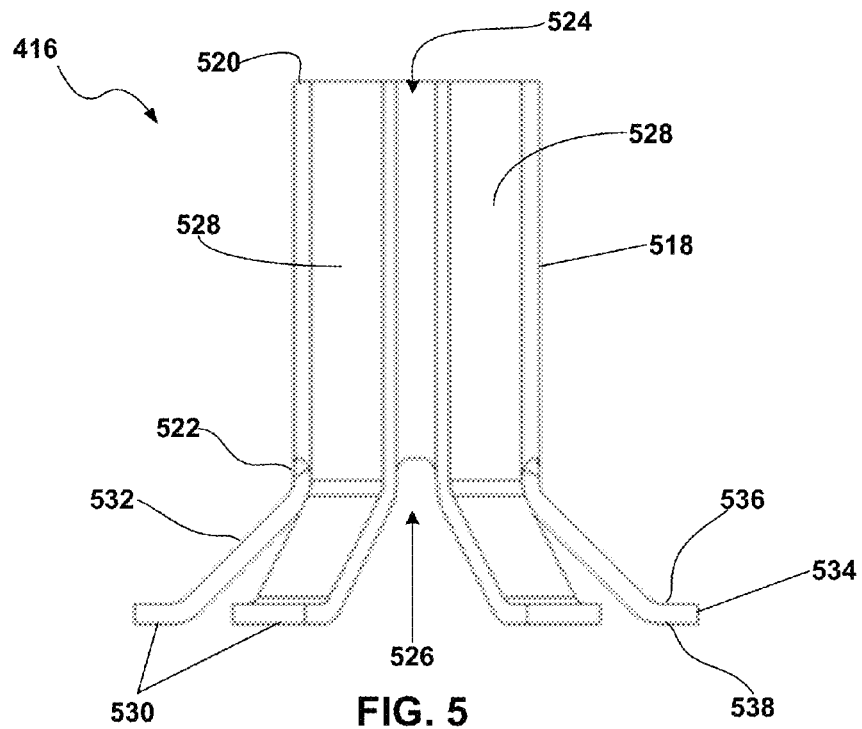
FIG. 5 is perspective view of one embodiment of the vibration reducing and/or modifying sleeve of FIG. 4 consistent with the present disclosure.
Figure 6A:
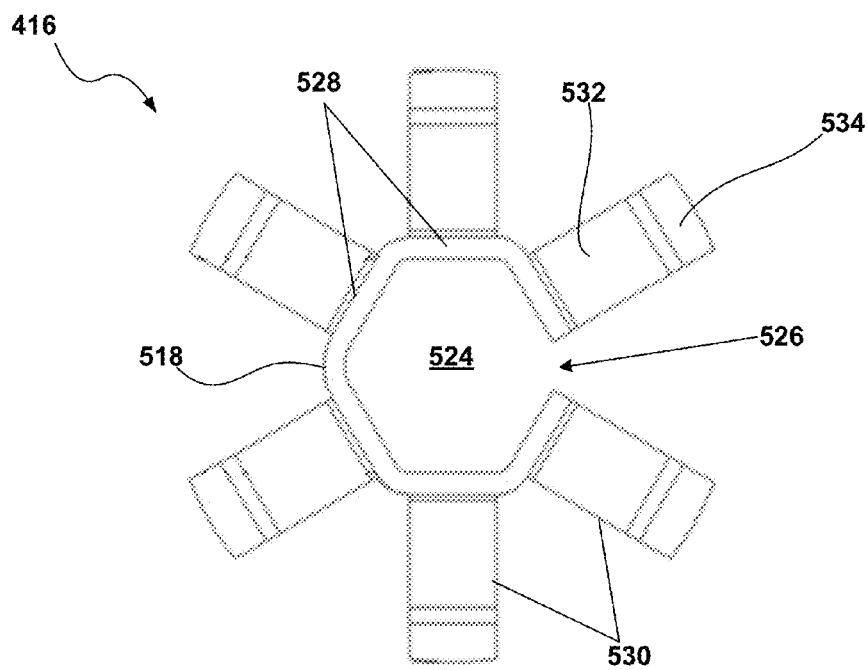
FIG. 6A is a top view of the vibration reducing and/or modifying sleeve of FIG. 5.

FIGS. 5 and 6A are perspective and top views of one embodiment of the sleeve of FIG. 4. In the illustrated embodiment, the sleeve 416 may include a body portion 518 having a first open end 520 and an opposing second open end 522. The body portion 518 may define a through passage 524 shaped and/or sized to receive the cable 404 and through which the cable 404 may pass. In the illustrated embodiment of FIGS. 5 and 6A, the body portion 518 may further include an open side 526 shaped and/or sized to receive the cable 404. In general, the open side 526 of the body portion 518 allows the sleeve 416 to be assembled to the system 400 after the system is fully assembly. In particular, the sleeve may be press fit onto the cable 404. For example, the open side 526 may be defined between adjacent walls 528 of the body portion 518, wherein the adjacent walls 528 may expand outwardly to accept the cable 404 in the through passage 524 of the body portion 518 and further contract inwardly and return to an original shape to close the body portion 518 around the cable 404, thereby retaining the cable 404 within the through passage 524. In one embodiment, a portion of the body portion 518 of the sleeve 416 can be crimped and/or formed to completely surround and enclose the cable 404 within the through passage 524.

As shown in FIG. 6A, the body portion 518 is generally hexagonal in shape. The body portion 518 may include walls 528 extending substantially longitudinally from the first end 520 to the second end 522 of the body portion 518. In the illustrated embodiment, the body portion 518 includes six (6) walls 528 corresponding to the hexagonal shape. It should be noted that in other embodiments, the body portion 518 may generally define various shapes and/or dimensions and may include any number of walls corresponding to the various shapes and/or dimensions.

As shown, each wall 528 further includes an associated member 530 extending outwardly from the second end 522 of the body portion 518. Each member 530 includes a transition portion 532 extending from a periphery of the second end 522 and a flange portion 534 extending from the transition portion 532. The transition portion 532 may arc or angle outwardly from the second end 522 of the body portion 518 to the flange portion 534. The flange portion 534 of each member 530 may include a top surface 536 and an opposing bottom surface 538, wherein the top surface 536 is configured to matingly engage a portion of the mounting nut 412 and the bottom surface 538 is configured to matingly engage a portion of the stop flange 414.

Figure 6B:
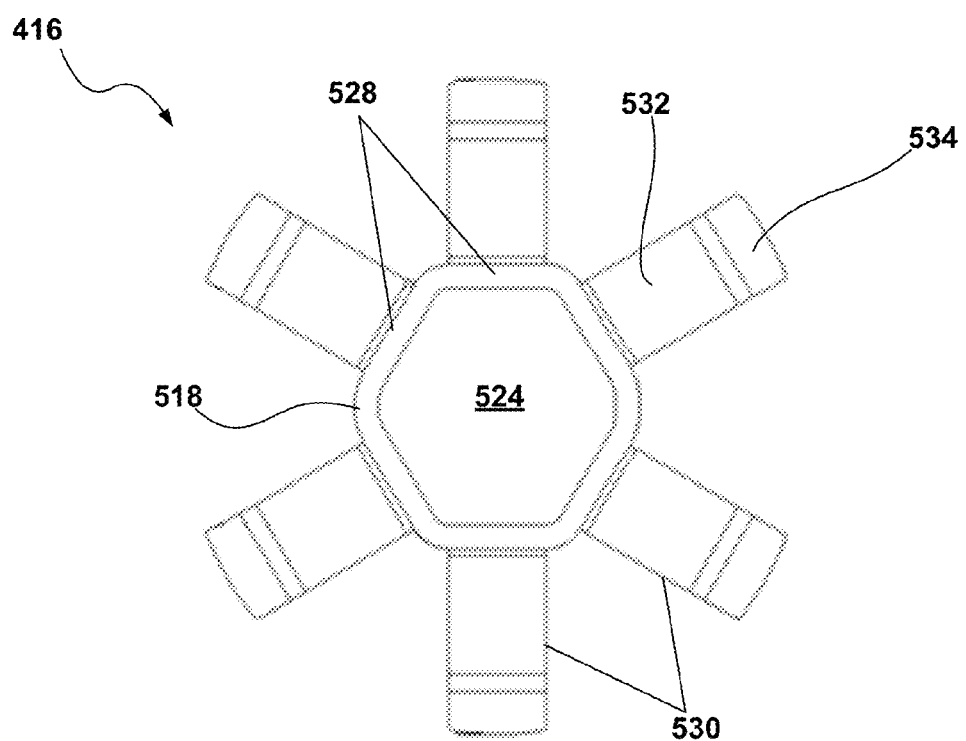
FIG. 6B is a top view of another embodiment of the vibration reducing and/or modifying sleeve of FIG. 4 consistent with the present disclosure.

It should be noted that in other embodiments, the body portion 518 may be continuous and without an open side, as shown in FIG. 6B. A sleeve consistent with the embodiment illustrated in FIG. 6B may be added during the assembly of the temperature sensor system 400. For example, as shown in FIG. 7, the sleeve 416 may be added to the system 400 after at least the stop flange 414 is coupled to the cable 404 wherein the sleeve 416 may fitted over the cable 404 and the sleeve 416 may freely move along a length of the cable 404.

Figure 7:
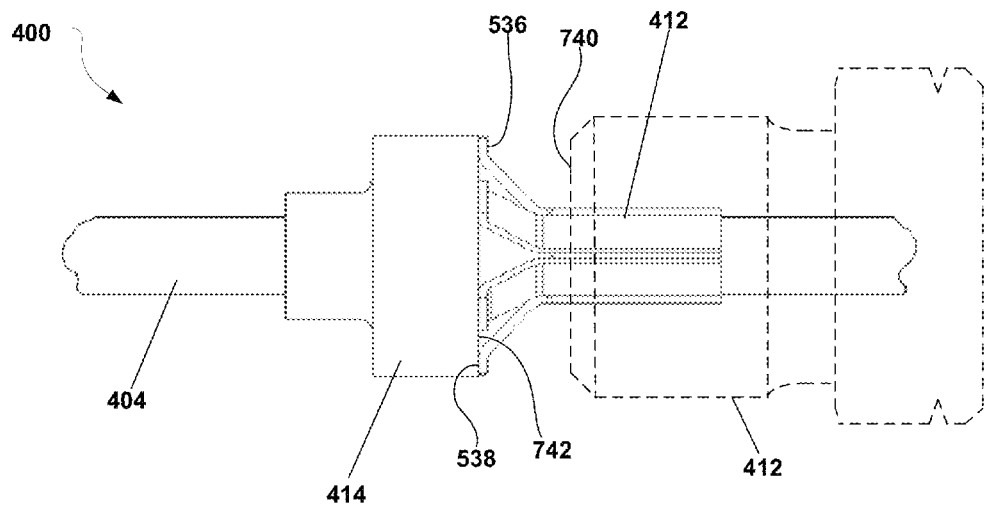
FIG. 7 is an enlarged side view of a portion of the temperature sensor system of FIG. 4.
Figure 8:
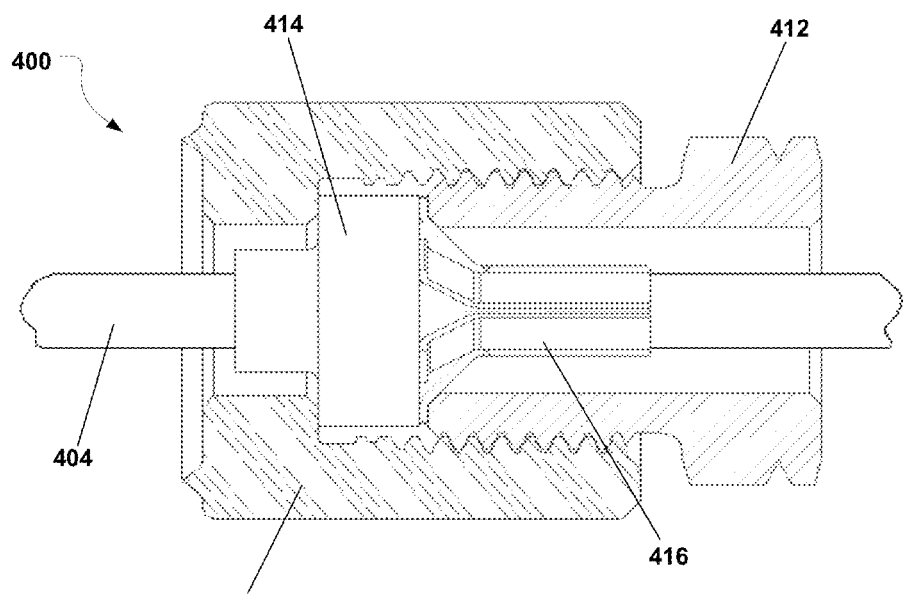
FIG. 8 is a cross-sectional view of the portion of the sensor system of FIG. 7 showing the sensor system coupled to a portion of an exhaust system.

FIG. 1 is an enlarged side view of a portion of the temperature sensor system of FIG. 4 and FIG. 8 is a cross-sectional view of the portion of the sensor system of FIG. 7 showing the sensor system coupled to a portion of an exhaust system. In the illustrated embodiment, the mounting nut 412 and the stop flange 414 each define a longitudinal bore through which at least a portion of the cable 404 may be received and pass through. As shown, the stop flange 414 is fixed to a portion of the cable 404 and the mounting nut 412 is configured to freely move along a length of the cable 404, wherein the cable 404 extends through both the stop flange 414 and the mounting nut 412. Additionally, the cable 404 extends through sleeve 416 positioned between the stop flange 414 and the mounting nut 412. It should be noted that, in FIG. 5, the mounting nut 412 is shown in phantom outline, so that the sleeve 416 is apparent.

The sleeve 416 may be configured to provide stability against mechanical vibration in the temperature sensor system 400. As previously described, the flange portion 534 of each member 530 of the sleeve 416 may include a top surface 536 and an opposing bottom surface 538. As shown, the top surface 536 is configured to matingly engage a surface 740 of the mounting nut 412 when the mounting nut 412 is coupled to, for example, a portion of the exhaust system, as shown in FIG. 8. Additionally, the bottom surface 538 of the flange portion 534 of each member is configured to matingly engage a surface 742 of the stop flange 414 when the mounting nut 412 and stop flange 414 are coupled to a portion of the exhaust system.

Referring to FIG. 8, the temperature sensor system 400 is shown coupled to a portion of the exhaust gas system 104 via the mounting nut 412 and stop flange 414 assembly. In the illustrated embodiment, the mounting nut 412 may be externally threaded and may be configured to be threaded within an aperture of the exhaust gas system (such as, but not limited to, the exhaust manifold, down pipe, or the like) until the stop flange 414 engages and/or makes contact with the exhaust system 104 (for example, a shoulder on the exhaust system). Installation of the temperature sensor system 400 to the exhaust system 104 may secure the sleeve 416 to the temperature sensor system 400. For example, the mechanical interface between the exhaust system 104 and the mounting nut 412 and stop flange 414 assembly of the system 400 may be configured to receive the sleeve 416 in manner which secures the sleeve 416 to both the stop flange 414 and the mounting nut 412. In particular, when the mounting nut 412 is threaded within an aperture of the exhaust system 104, the mounting nut 412 moves along a length of the cable 404 until a portion of the nut 412 engages at least a portion of the sleeve 416, thereby securing the sleeve 416 to the stop flange 414. More specifically, the transition portion 532 of each member 530 may be configured to center the mounting nut 412 over the cable 404, thereby centering the temperature sensor system 400 within the portion (e.g., aperture) of the exhaust system 104. Thus, the sleeve 416 may exhibit self-centering capabilities. Additionally, the sleeve 416 may be configured to center the temperature sensor 402 within the mounting nut 412. The mounting nut 412 may also force the top and bottom surfaces 536, 538 of the flange portion 534 of each member 530 against the surfaces 740, 742 of the mounting nut 412 and stop flange 414, respectively, thereby securing the sleeve 416 to the temperature sensor system 400.

It should be noted that the shapes and/or dimensions of the body portion 518, the members 530, the transition portion 532 and the flange portion of each member 530, of the sleeve 416, as well as the location of the sleeve 416 on the temperature sensor system 400 can vary depending on the vibration conditions of the temperature sensor system 400 application and/or the variation of the mounting requirements of the vehicle.

Figure 11:
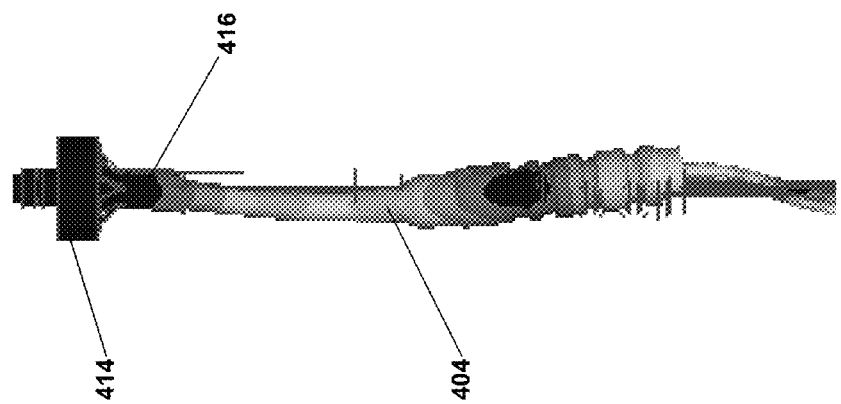
FIGS. 10-11 diagrammatically illustrate vibration performance of a sensor system consistent with the present disclosure including a vibration reducing and/or modifying sleeve consistent with the present disclosure.
Figure 10:
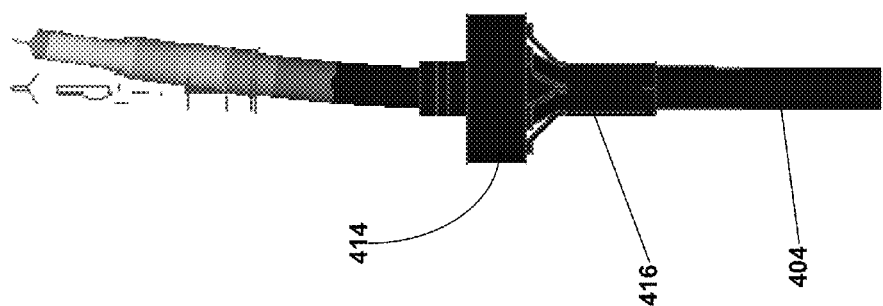
Figure 9:
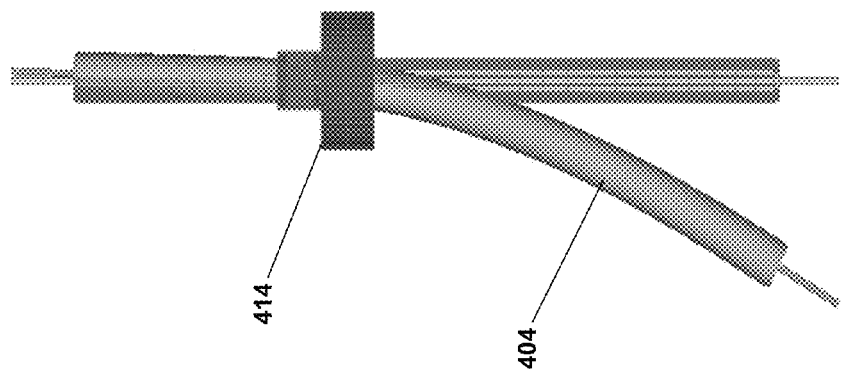
FIG. 9 diagrammatically illustrates vibrational performance of a sensor system not including a vibration reducing and/or modifying sleeve.

Advantageously, a sleeve consistent with the present disclosure reduces vibrational stresses on the sensor system providing longer system life. For example, FIG. 9 illustrates the results of a vibration test for a temperature sensor system that does not include an anti-vibration sleeve consistent with the present disclosure, and FIGS. 10-11 illustrate the results of the vibration test for a temperature sensor system 400 including a vibration reducing and/or modifying sleeve consistent with the present disclosure. As diagrammatically illustrated in FIGS. 9-11, a system including a vibration reducing and/or modifying sleeve 416 is more vibrationally stable than a system without an anti-vibration sleeve, i.e. displacement is less in the illustrated x and y directions, when vibrated at the same or higher frequencies. A sleeve consistent with the present disclosure may shift where resonant frequency occurs and reduces vibration stresses in various areas of sensor assembly.

The sleeve 416 may include a flexible, resilient, and durable material capable of being deformed when a force is applied thereto, such as bending and/or tension forces. Additionally, the sleeve 416 may include a memory material. Additionally, the sleeve 416 may include material capable of withstanding high temperatures and/or heat.

According to one aspect of the disclosure, there is provided a temperature sensor system. The temperature sensor system includes a temperature sensor, a cable having an end coupled to the temperature sensor, a stop flange coupled to the cable and vibration reducing and/or modifying sleeve positioned against a bottom surface of the stop flange and between the stop flange and the temperature sensor. The sleeve may include a body portion defining a through passage configured to receive and retain at least a portion of the cable.

According to another aspect of the disclosure, there is provided a temperature sensor system. The temperature sensor system includes a temperature sensor. The temperature sensor includes a housing, a temperature sensing element disposed in the housing and electrical connections extending from the temperature sensing element through the housing. The temperature sensor further includes a filler material disposed in the housing and at least partially around the temperature sensing element. The filler material provides a thermal pathway between the sensing element and the housing and is flexible to accommodate different rates of thermal expansion between the temperature sensing element and the electrical connections.

The temperature sensor system further includes a cable having an end coupled to the temperature sensor, a stop flange coupled to the cable and a vibration reducing and/or modifying sleeve positioned against the stop flange. The sleeve includes a body portion defining a through passage configured to receive and retain at least a portion of the cable. The sleeve is configured to provide stability and reduce vibrational stress to the temperature sensor system.

According to yet another aspect of the disclosure, there is provided a system. The system includes an engine, an exhaust system configured to carry exhaust gases from the engine, a temperature sensor system coupled to the exhaust system for detecting a temperature of the exhaust gases and a vehicle control system configured to control at least one operating parameter of the engine in response to an output of the temperature sensor. The temperature sensor system a temperature sensor, a cable having an end coupled to the temperature sensor, a stop flange coupled to the cable and vibration reducing and/or modifying sleeve positioned against a bottom surface of the stop flange and between the stop flange and the temperature sensor. The sleeve may include a body portion defining a through passage configured to receive and retain at least a portion of the cable.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A temperature sensor system comprising:
   a temperature sensor;
   a cable having an end coupled to said temperature sensor;
   a stop flange coupled to said cable; and
   a vibration reducing and/or modifying sleeve positioned against said stop flange, said sleeve comprising a body portion having a first open end and an opposing second open end defining a through passage configured to receive and retain at least a portion of said cable, wherein said body portion further comprises a plurality of transition portions extending from said second open end of said body portion, each transition portion including a flange portion.

2. The temperature sensor system of claim 1, wherein said sleeve is configured to provide stability and reduce vibrational stress to said temperature sensor system.

3. The temperature sensor system of claim 1, wherein said temperature sensor comprises:
   a housing;
   a temperature sensing element disposed in said housing; and
   electrical connections extending from said temperature sensing element through said housing.

4. The temperature sensor system of claim 1, further comprising a mounting nut coupled to said cable and configured to freely traverse along a length of said cable, said stop flange being positioned between said temperature sensor and said mounting nut and said sleeve being positioned between said stop flange and said mounting nut.

5. The temperature sensor system of claim 4, wherein said sleeve is configured to center said temperature sensor within said mounting nut.

6. The system of claim 1, wherein each of said plurality of transition portions extends from different portions of a periphery of said second open end of said body portion compared to an adjacent transition portion.

7. The system of claim 6, wherein said body portion has a generally hexagonal shape defining six walls each extending longitudinally from said first open end of said body portion to said opposing second open end of said body portion, and wherein each of said walls comprises one of said plurality of transition portions.

8. The temperature sensor system of claim 1, wherein said body portion of said sleeve comprises a plurality of walls extending longitudinally from said first open end of said body to said opposing second open end of said body.

9. The temperature sensor system of claim 8, wherein said body portion has an open side defined by two adjacent walls of said body portion, wherein at least one of said two adjacent walls is configured to expand outwardly and receive at least a portion of said cable.

10. The temperature sensor system of claim 8, wherein each of said plurality of walls comprises said transition portion.

11. The temperature sensor system of claim 10, wherein said flange portion defines a top surface and an opposing bottom surface, wherein said top and bottom surfaces engage portions of said mounting nut and said stop flange, respectively.

12. A temperature sensor system comprising:
   a temperature sensor comprising:
      a housing;
      a temperature sensing element disposed in said housing;
      electrical connections extending from said temperature sensing element through said housing; and
      a filler material disposed in said housing and at least partially around said temperature sensing element, said filler material providing a thermal pathway between said sensing element and said housing and being flexible to accommodate different rates of thermal expansion between said temperature sensing element and said electrical connections;
a cable having an end coupled to said temperature sensor;
a stop flange coupled to said cable; and
a vibration reducing and/or modifying sleeve positioned against said stop flange, said sleeve comprising a body portion having a first open end and an opposing second open end defining a through passage configured to receive and retain at least a portion of said cable, wherein said body portion further comprises a plurality of transition portions extending from said second open end of said body portion, each transition portion including a flange portion.

13. A system comprising:
an engine;
an exhaust system configured to carry exhaust gases from said engine;
a temperature sensor system coupled to said exhaust system for detecting a temperature of said exhaust gases, said temperature sensor system comprising:
 a temperature sensor;
 a cable having an end coupled to said temperature sensor;
 a stop flange coupled to said cable; and
 a vibration reducing and/or modifying sleeve positioned against said stop flange, said sleeve comprising a body portion having a first open end and an opposing second open end defining a through passage configured to receive and retain at least a portion of said cable, wherein said body portion further comprises a plurality of transition portions extending from said second open end of said body portion, each transition portion including a flange portion; and
a vehicle control system configured to control at least one operating parameter of said engine in response to an output of said temperature sensor.

14. The system of claim 13, wherein each of said plurality of transition portions extends from different portions of a periphery of said second open end of said body portion compared to an adjacent transition portion.

15. The system of claim 13, further comprising a mounting nut coupled to said cable and configured to freely traversing along a length of said cable, said stop flange being positioned between said temperature sensor and said mounting nut and said sleeve being positioned between said stop flange and said mounting nut.

16. The system of claim 15, wherein said sleeve is configured to center said temperature sensor within said mounting nut.

17. The system of claim 16, wherein said body portion of said sleeve comprises a plurality of walls extending longitudinally from said first open end of said body to said opposing second open end of said body.

18. The system of claim 17, wherein said body portion has an open side defined by two adjacent walls of said body portion, wherein at least one of said two adjacent walls is configured to expand outwardly and receive at least a portion of said cable.

19. The system of claim 17, wherein each of said plurality of walls comprises a member, said member comprising a transition portion extending from said second open end of said body portion and a flange portion extending from said transition portion.

20. The system of claim 19, wherein said flange portion defines a top surface and an opposing bottom surface, wherein said top and bottom surfaces engage portions of said mounting nut and said stop flange, respectively.

* * * * *